UNITED STATES PATENT OFFICE.

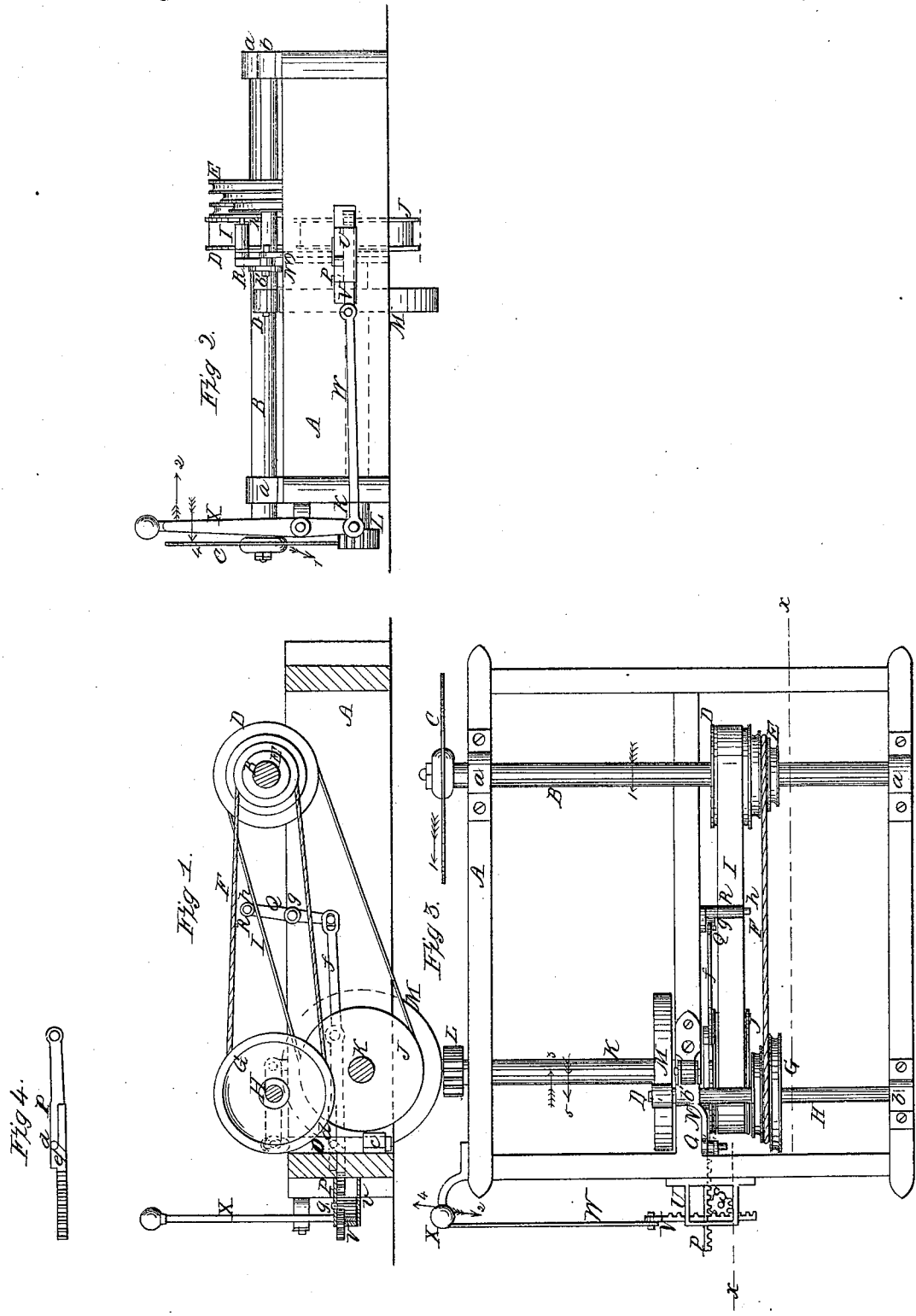

HIRAM WELLS, OF FLORENCE, MASSACHUSETTS.

ARRANGEMENT OF DEVICES TO FEED AND GIG BACK THE CARRIAGE IN CIRCULAR SAWING MACHINES.

Specification of Letters Patent No. 19,166, dated January 19, 1858.

*To all whom it may concern:*

Be it known that I, HIRAM WELLS, of Florence, in the county of Hampshire and State of Massachusetts, have invented a new and Improved Feeding Device for Circular-Saw Mills; and I do hereby declare that the following is a full, clear, and exact description of the same, reference being had to the annexed drawings, making a part of this specification, in which—

Figure 1, is a vertical section of my improvement taken in the line (*x*) (*x*) Fig. 3. Fig. 2, is an end view of ditto. Fig. 3, is a plan or top view of ditto. Fig. 4, is a detached view of the rack bar which is connected with the lever which carries the belt friction roller.

Similar letters of reference indicate corresponding parts in the several figures.

This invention relates to an improved arrangement of means for feeding the "stuff" to the saw, and also gigging back the same by friction.

To enable those skilled in the art to fully understand and construct my invention I will proceed to describe it.

A, represents a rectangular frame on one end of which a shaft or arbor B, is placed and fitted in suitable bearings (*a*) (*a*).

C is a circular saw placed on one end of the shaft or arbor B, and D is a pulley placed thereon, said pulley having a cone E, of pulleys attached to one side of it.

F, is a cord or band which passes around the cone E, and also around a cone G, on a shaft H which is placed on the frame A parallel with the shaft or arbor B and at the opposite end of the frame.

I is a bolt which passes around the pulley D and around a pulley J on a shaft K, which is placed in the frame below the shaft H. The outer end of the shaft K has a pinion L placed on it, and this pinion gears into a rack on the carriage as usual. The shaft K also has a pulley M, placed on it, the face or periphery of which is made smooth and even. The outer bearing (*b*) of the shaft H is attached permanently to the frame A, but the inner bearing (*b'*) is formed in an arm N, one end of which is pivoted to the frame A and the opposite end connected to a vertical bar O, the lower end of which is fitted and allowed to work freely in a guide (*c*). On the inner end of the shaft H, a roller D is placed, said roller being directly over the pulley M.

The bar O, has a pin (*d*) projecting from it, said pin fitting in an inclined slot (*e*) in a rack bar P, which is fitted and works horizontally in the frame A. The inner end of this rack bar is connected by a link (*f*) with the lower end of a lever Q which is pivoted in the frame A at (*g*), the upper end of said lever having a rod (*h*) projecting horizontally from it, said rod serving as an axis for a roller R. The outer end of the rack bar P, gears into a pinion S which is fitted in a box U attached to the frame A, and a rack V also gears into said pinion, the rack V, being attached to a rod W, the outer end of which is pivoted to the lower end of a lever X.

The operation is as follows:—The power is applied to the shaft or arbor B in any proper manner, and said shaft rotating in the direction indicated by arrow 1. Motion is communicated to the shaft H, by the band F, the two shafts B, H, always rotating in the same direction. To feed the stuff to the saw C the attendant moves the lever X in the direction indicated by arrow 2, Fig. 2, and the rack V, will rotate the pinion S which will throw the rack bar P, inward or forward and the lever Q will be so moved that the roller R will be raised free from the belt I and the rod or bar O drawn down in consequence of the inclined slot (*e*) acting upon the pin (*d*) the roller D on shaft H being drawn down and made to bear with sufficient pressure on pulley M to cause the shaft K to rotate in the direction indicated by arrow 3, the pinion L feeding the carriage forward. When the stuff is to be gigged back the lever X is moved in a reverse direction indicated by arrow 4, and the rack bar P is moved outward or backward on the lever Q so operated that the roller R will be pressed upon the belt I, and the arm N, moved upward so that the roller D will be free from the pulley M, motion therefore will be communicated directly to shaft K from shaft B, by the belt I, and in a reverse direction to that given through the medium of the roller D and pulley M, as indicated by arrow 5 Fig. 3, the relative size of the several pulleys being such that the gigging back motion as usual will be considerably move rapid than the feed motion.

I am aware that various devices have been employed for feeding the carriage to the saw and gigging back the same by means of friction and friction and gearing combined, and I therefore do not claim broadly such device, irrespective of the arrangement and particular means employed for the purpose as herein shown,

I claim, therefore and desire to secure by Letters Patent,—

The arrangement of the rack V, pinion S, rack-bar P, lever Q, roller I slot (e), pin d, and roller D, as set forth, whereby the shaft K will be rotated in either direction at pleasure, according as the lever X is moved.

HIRAM WELLS.

Witnesses:
 HIRAM STEBBINS,
 AUSTIN I. ALLIS.